United States Patent
Plett et al.

(10) Patent No.: US 10,570,484 B2
(45) Date of Patent: Feb. 25, 2020

(54) HIGH TENSILE BRASS ALLOY AND HIGH TENSILE BRASS ALLOY PRODUCT

(71) Applicant: Otto Fuchs Kommanditgesellschaft, Meinerzhagen (DE)

(72) Inventors: Thomas Plett, Schmallenberg (DE); Björn Reetz, Krefeld (DE); Hermann Gummert, Viersen (DE)

(73) Assignee: OTTO FUCHS KOMMANDITGESELLSCHAFT, Meinerzhagen (DE)

( * ) Notice: Subject to any disclaimer, the term of this patent is extended or adjusted under 35 U.S.C. 154(b) by 0 days.

(21) Appl. No.: 16/068,193

(22) PCT Filed: May 17, 2017

(86) PCT No.: PCT/EP2017/061803
§ 371 (c)(1),
(2) Date: Jul. 5, 2018

(87) PCT Pub. No.: WO2017/198691
PCT Pub. Date: Nov. 23, 2017

(65) Prior Publication Data
US 2019/0017149 A1    Jan. 17, 2019

(30) Foreign Application Priority Data

May 17, 2017 (DE) .................... 20 2016 102 693 U

(51) Int. Cl.
*C22C 9/04* (2006.01)
*F16C 33/12* (2006.01)
*F16C 17/04* (2006.01)

(52) U.S. Cl.
CPC .............. *C22C 9/04* (2013.01); *F16C 33/121* (2013.01); *F16C 17/04* (2013.01); *F16C 2204/14* (2013.01); *F16C 2360/24* (2013.01)

(58) Field of Classification Search
CPC .................................. C22C 9/04; F16C 33/121
(Continued)

(56) References Cited

U.S. PATENT DOCUMENTS

| 4,874,439 A | 10/1989 | Akutsu |
| 4,995,924 A | 2/1991 | Akutsu |

(Continued)

FOREIGN PATENT DOCUMENTS

| CH | 223580 | 12/1942 |
| CN | 101709405 A | 5/2010 |

(Continued)

OTHER PUBLICATIONS

International Search Report dated Nov. 23, 2017 in parent case PCT/EP2017/061803.
(Continued)

*Primary Examiner* — Weiping Zhu
(74) *Attorney, Agent, or Firm* — Polson Intellectual Property Law, PC; Margaret Polson; Christopher Sylvain

(57) ABSTRACT

The present disclosure relates to a high-tensile brass alloy containing 55-65 wt-% copper; 1-2.5 wt-% manganese; 0.7-2 wt % tin; 0.2-1.5 wt % iron; 2-4 wt % nitrogen; 2-5 wt % aluminum; 0.2-2 wt % silicon; 2.0 wt % cobalt maximum; and the remainder zinc together with unavoidable impurities, wherein the sum of the elements manganese and tin is at least 1.7 wt % and at most 4.5 wt.

20 Claims, 8 Drawing Sheets

(58) Field of Classification Search
USPC .......................................................... 420/471
See application file for complete search history.

(56) References Cited

U.S. PATENT DOCUMENTS

| | | | |
|---|---|---|---|
| 5,114,468 | A | 5/1992 | Akutsu et al. |
| 5,183,637 | A | 2/1993 | Tanaka et al. |
| 8,435,361 | B2 | 5/2013 | Gaag et al. |
| 2008/0219881 | A1 | 9/2008 | Gaag |
| 2008/0240973 | A1 | 10/2008 | Gaag et al. |
| 2009/0022620 | A1 | 1/2009 | Weber |
| 2009/0092517 | A1 | 4/2009 | Kosaka et al. |
| 2011/0211781 | A1 | 9/2011 | Toda et al. |
| 2012/0020600 | A1 | 1/2012 | Nishimura et al. |
| 2013/0330227 | A1 | 12/2013 | Gaag et al. |
| 2014/0259674 | A1 | 9/2014 | Zhu et al. |
| 2016/0348215 | A1* | 12/2016 | Gummed; Hermann ................... F16D 23/025 |
| 2017/0051385 | A1 | 2/2017 | Gummert et al. |

FOREIGN PATENT DOCUMENTS

| | | |
|---|---|---|
| CN | 102251142 A | 11/2011 |
| CN | 103589903 A | 2/2014 |
| CN | 103602998 A | 2/2014 |
| DE | 1558817 | 4/1970 |
| DE | 1558467 | 7/1970 |
| DE | 2718495 A1 | 11/1978 |
| DE | 19908107 A1 | 8/2000 |
| EP | 0407596 A1 | 1/1991 |
| EP | 1712648 A2 | 10/2006 |
| EP | 2135964 A2 | 12/2009 |
| JP | 56127741 | 6/1981 |
| JP | S60162742 A | 8/1985 |
| JP | 2001355029 A | 12/2001 |
| JP | 2009007673 A | 1/2009 |
| WO | 2004003244 A1 | 1/2004 |
| WO | 2014152619 A1 | 9/2014 |
| WO | 2015117972 A2 | 8/2015 |
| WO | WO-2015117972 A2 * | 8/2015 ........... F16D 23/025 |
| WO | 2015173291 A2 | 11/2015 |

OTHER PUBLICATIONS

International Preliminary Report on Patentability dated Mar. 4, 2019 in parent case PCT/EP2017/061803.
Pending U.S. Appl. No. 15/104,437, filed Jun. 14, 2016.
Pending U.S. Appl. No. 15/119,073, filed Aug. 15, 2016.
Pending U.S. Appl. No. 15/300,234, filed Sep. 28, 2016.
Weber K et al: "Neuer Pb-freier 1,2,5 Kupferwerkstoff fuer Gleitlageranwendungen in Verbrennungsmotoren und Getrieben", Metall : Fachzeitschrift für Metallurgie; Technik, Wissenschaft, Wirtsc, GDMB-Verag, Clausthal-Zellerfeld, DE, Bd. 63, Nr. 11, Nov. 1, 2009 (Nov. 1, 2009), Seiten 564-567, XP009157102, ISSN: 0026-0746. 4 pages. English translation of abstract appears on last page.
Kurbatkin I I et al: "Effect of 1-5composition on the structure and properties of complex brasses used in the automotive industry", Cvetnye Metally (Tsvetnye Meta, Moskva : Gos. Ob'Edinnoe Nauä No-Techniä Eskoe Izdat, Nr. 3, Jan. 1, 1994 (Jan. 1, 1994), Seiten 44-46, XP009186304, ISSN: 0372-2929. 3 pages. English abstract appears on last page.
U.S. Appl. No. 16/586,949, filed Sep. 28, 2019.

* cited by examiner

CuZn37Mn3Al2PbSi

CuZn36

HIGH TENSILE BRASS ALLOY AND HIGH TENSILE BRASS ALLOY PRODUCT

BACKGROUND

The present disclosure relates to a high-tensile brass alloy and a product, made of a high-tensile brass alloy, subjected to friction load.

For typical friction applications in a lubricant environment, low coefficients of friction of the alloy used are generally required. Additionally, the coefficient of friction should be adaptable within predefined limits to the particular application, specifically the friction partner, the lubricant used, and the friction conditions, such as contact pressure and relative speed. In particular, this is true for piston sleeves, which are acted on by high static and dynamic loads, as well as for synchronizer rings. Furthermore, applications with high relative speeds of friction partners, as are present for axial bearings of a turbocharger, for example, require alloys which in addition to reduced heat generation also ensure good heat dissipation from the friction surface.

The friction power and the oil contact result in a tribological layer which has accumulated lubricant components on the bearing surface. A uniform, high deposition rate of the lubricant components and their breakdown products is necessary to obtain a sufficiently stable adsorption layer on the sliding layer.

A suitable material for a component that is used in an oil environment, such as a synchronizer ring or a bearing part for a bearing in such an environment, is additionally characterized by wide-ranging oil tolerance, so that the structure of the tribological layer is largely insensitive to the selection of certain oil additives. Additionally, a component made of such an alloy should have good emergency running properties, so that a sufficient service life, even under dry friction conditions, may be ensured.

For components under friction load, it is also important that the alloy used have sufficient strength. Accordingly, a high 0.2% yield strength should be present to minimize plastic deformations that occur under load. Nevertheless, such a component should have a certain degree of plastic deformation above the yield strength, to the point of failure.

Also, it is necessary for such components to be particularly hard and to have high tensile strength in order to increase their resistance to abrasive and adhesive stresses. At the same, there must be sufficient toughness as protection against impact stresses. In this regard, it is necessary to reduce the number of microdefects and retard the defect growth that develops therefrom. This is accompanied by the requirement of providing an alloy having a preferably high fracture toughness and which is largely free of internal stresses.

In many cases, suitable alloys for parts under friction load are high-tensile brasses, which in addition to copper and zinc as the primary components are alloyed with at least one of the elements nickel, iron, manganese, aluminum, silicon, titanium, or chromium. Silicon brasses in particular meet the requirements stated above; CuZn31Si1 represents a standard alloy for friction applications such as piston sleeves. Furthermore, it is known to use tin bronzes, which in addition to tin and copper additionally contain nickel, zinc, iron, and manganese, for friction applications or mining.

A brass alloy for use in turbocharger bearing applications is known from WO 2014/152619 A1. This brass alloy contains a large quantity of manganese, with 1.5 to 3.0 wt %, but only a small amount of Sn, in particular less than 0.4 wt %. This previously known brass alloy allows a maximum lead content of 0.1 wt %, to adhere to the stringent requirements for freedom from lead. However, it is favorable to incorporate lead as an alloy component in brass alloys, since this facilitates chip breaking, thus improving machining. In addition, lead is typically incorporated as a corrosion inhibitor in high-strength brass alloys, whose alloy products are used in an oil environment. This applies in particular to oil environments that come into contact with bioethanol. Bioethanol is contained in vehicular fuel, and passes into the motor oil, for example, due to leaks in the piston rings or other types of entrainment. This applies to vehicles that are primarily used for short trips, where the engine does not reach its operating temperature. The same applies for turbocharger bearings, which as a result of the bioethanol and its waste products contained in the exhaust gases are exposed to an aggressive mixture. Thus, an acidic environment develops in the oil. A lead sulfate surface layer forms from the sulfur contained in the oil together with the lead contained in the alloy product. This surface layer acts as a corrosion inhibitor, similar to a passivation layer.

The structure of such a brass alloy, which may have different phases in the matrix, also affects the mechanical load capacity and the corrosion resistance. Brass alloy products with a high proportion of the α phase are characterized by generally good corrosion resistance, high toughness and elongation at break, and good cold formability. It is disadvantageous that these types of alloy products have rather poor hot forming capability as well as low resistance to abrasion and adhesion. In contrast, brass alloy products having a β phase have high mechanical wear resistance, high strength, good heat formability, and low adhesion. A disadvantage of these alloy products, however, is their relatively poor cold formability, relatively low toughness, and much poorer corrosion resistance compared to a brass alloy product having an α phase. Although brass alloy products having a γ phase are characterized by good corrosion resistance and good mechanical wear resistance, they have low toughness and relatively low forming capability. Thus, it is apparent that, although each phase has advantages in one area or the other, disadvantages must be accepted.

For brass alloy products of the type under discussion which are used in an oil environment, corrosion also plays a role, as previously indicated. In this regard, an alloy from which alloy products are produced and used, for example in an oil environment with respect to an axial bearing, must also meet these requirements.

Under friction load, an adsorption layer that is composed primarily of lubricant additives develops on a workpiece made of a copper alloy, even after a short period of contact with the lubricant. Under thermomechanical stress, a reaction layer composed of mutually reactive components of the adsorption layer and alloy constituents near the surface forms beneath the adsorption layer. In the process, the adsorption layer and the reaction layer form an outer boundary layer on the copper alloy workpiece, below which an inner boundary layer several microns thick is situated. Due to its proximity to the outer boundary layer, the inner boundary layer is affected by the mechanical load that acts on the surface, as well as by the chemical conversion processes in the reaction layer. Diffusion processes and oxidation processes of the substrate alloy may influence formation of the reaction layer around the inner boundary layer.

Many lubricants contain additives, such as sulfur- and phosphorus-containing additives, which under appropriate thermomechanical stress due to frictional contact may have a corrosive effect, which in turn reduces the service life of a workpiece considerably. Copper alloys have already been proposed to reduce the corrosive effect of sulfur components in the lubricant. A copper alloy for the bearing of a turbocharger is known from JPS60162742 A, having a composition of 57-61% copper and 2.5-3.5% lead by weight, with iron and zinc possibly present as impurities. The aim is to form a stable CuS layer on the friction surface.

Additives are often added to lubricants with the aim of reducing the corrosion on a friction surface and decreasing the abrasive wear. One example of such a corrosion inhibitor (anti-wear active substance) is zinc dialkyl dithiophosphate. A phosphate glass that protects the surface forms in the reaction layer from this additive. To this end, ideally an exchange of the ligands of the additive with alloy elements as well as intercalation of substrate cations take place, so that a durable reaction layer forms. However, reaction processes that protect the surfaces are dependent on the composition of the inner boundary layer of the substrate material. Furthermore, additional additives in the adhesion layer may influence the process by having a competing effect, regarding adhesion, with the additives that protect the surfaces. Also, of significance for the layer formation and degradation processes are the alloy structure, thermal processes of the reaction layer in regards to heat dissipation, and localized temperature peaks. This could possibly even result in an undesirable chemical degradation process of the friction layer, with involvement of corrosion inhibitors, as a function of the particular tribological system that is present.

The foregoing examples of the related art and limitations therewith are intended to be illustrative and not exclusive. Other limitations of the related art will become apparent to those of skill in the art upon a reading of the specification and a study of the drawings.

SUMMARY

Proceeding from the foregoing, an aspect of the present disclosure is to propose a high-tensile brass alloy from which high strength products may be manufactured, as well as reduce wear under friction load, and have good emergency running properties when there is inadequate lubrication. Furthermore, the high-tensile brass alloy may be lead-free or practically leadfree, to comply with the regulatory requirements for lead, while still being resistant to corrosion in an acidic environment. The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

This aspect of the present disclosure is achieved by a high-tensile brass alloy having the following alloy components:
  55-65 wt % Cu;
  1-2.5 wt % Mn;
  0.7-2 wt % Sn;
  0.2-1.5 wt % Fe;
  2-4 wt % Ni;
  2-5 wt % Al;
  25 0.2-2 wt % Si;
  maximum 2.0 wt % Co;
  and the remainder Zn together with unavoidable impurities.

Within the scope of the present discussion, unavoidable impurities are those elements in the alloy which individually do not constitute more than 0.05 wt %, and in total do not constitute more than 0.15 wt %.

The alloy products manufactured from this high-tensile brass alloy predominantly have a β phase. It was therefore expected that they would be characterized by good heat formability and good mechanical wear resistance. Interestingly, however, the alloy products manufactured from this high-tensile brass alloy have a corrosion resistance that was otherwise known only for brass alloy products predominantly having an α phase. This is even more surprising since this high-tensile brass alloy is basically lead-free (within the tolerable limits to still allow a lead-free designation). Ultimately, it corresponded to the prevailing teaching that lead must necessarily be an alloy component to achieve a certain corrosion resistance when used in acid-containing oil environments, since according to the prevailing opinion, lead cannot be omitted in the formation of a corrosion-inhibiting cover layer. However, due to its chemical composition, with this high-tensile brass alloy it has been possible not only to replace the properties attributed to the alloy element lead in conventional practices, but also significantly improve the corrosion resistance compared to customary alloy products having a β phase in the matrix. This high-tensile brass alloy is a lead-free high-tensile brass alloy, in particular within the meaning of the End-of-Life Vehicle Directive.

A special feature of this alloy is that manganese is predominantly bound in the silicides, while tin is dissolved in the β phase. The manganese portion not bound in the silicides is dissolved in the α phase. This is advantageous due to the fact that, because of the tin dissolved in the β phase, not only is a β cover layer-forming agent present, but also an α cover layer-forming agent is present due to the manganese dissolved in the α phase.

The particular corrosion resistance of alloy products, made from this alloy, in an oil environment is determined in particular by the content of the elements manganese and tin; also, if present in the alloy, cobalt, preferably being between 0.8 and 1.6 wt %. Tests have shown that the participation of these elements is important, where manganese and tin are alloy components, in particular at least 1.7 wt % in total but not more than 4.5 wt % in total. Additionally, it is advantageous when the manganese content and the tin content are incorporated into the structure of the alloy in similar ranges. The incorporation of the elements manganese and tin in the structure of the alloy in similar ranges means that the ratio of manganese to tin is in a range between approximately 1.25 and 0.85. In the claimed alloy, the manganese content is utilized to extend the area in which the α phase exists. As a result, the tin contained in the alloy likewise is not prematurely bound in a γ phase, but, instead, like the manganese, is available for the desired cover layer formation. Furthermore, tin is used for the desired emergency running properties as well. For this reason, the incorporation of the elements manganese and tin in the alloy has been carefully coordinated. The ratio of manganese to tin is preferably between 1.1 and 0.92, in particular between 1.05 and 0.95.

The corrosion resistance may be improved even further if cobalt is present in the alloy. Therefore, in one preferred embodiment cobalt is present as an alloy element in fractions between 0.9 and 1.6 wt %, in particular between 0.9 and 1.5 wt %, but preferably between 0.9 and 1.1 wt %. Cobalt can influence the activity of other alloy elements, and thus contributes to the development of a corrosion-inhibiting cover layer. If cobalt is contained in the alloy, this element takes part in the formation of mixed silicides, so that, within the scope of this alloy composition, a higher proportion of manganese remains dissolved in the matrix and is then available to a sufficient extent for the desired formation of a cover layer. In this regard, incorporation of cobalt into the structure of the alloy contributes considerably to the formation of a corrosion-inhibiting cover layer.

Surprisingly, the good corrosion properties of an alloy product manufactured from this alloy were also due to the fact that lead in principle has not been replaced by an additional, different element. Instead, the good corrosion resistance properties have been achieved by increasing the tin content and by the internal coordination, indicated above, primarily with the element manganese, and if an alloy is present, with cobalt.

The above-described advantages and beneficial properties of the high-tensile brass alloy or a high-tensile brass alloy product manufactured therefrom are also due to the iron content, which is allowed only in a narrow range, in particular between 0.2 and 1.5 wt %. In one exemplary embodiment, this allowed iron range is only 0.5 to 1.0 wt % iron. Interestingly, it has been observed that, outside the allowed iron content in the high-tensile brass alloy, the described properties of the high-tensile brass alloy product manufactured therefrom do not result, in particular, when the iron content is too low or also when the iron content is higher.

The increased resistance of a component manufactured from this alloy, regarding corrosion stresses, is also due to the fact that the components manufactured from this alloy only have a low electrical conductivity, which sometimes is even lower than that of reference alloys. Electrical corrosion currents are thus greatly reduced compared to previously known alloys of this type.

The tin proportion is largely responsible for the required emergency running properties that an alloy product manufactured from this alloy, as part of a bearing, should have. Thus, in this alloy the alloy element tin has a dual function, namely, corrosion protection and emergency running properties of the alloy.

A component, manufactured from this alloy, which is subjected to customary heat treatment, attains the strength values that are imposed on such a component, regarding the 0.2% yield strength as well. This is particularly advantageous for a geometric adaptation of the friction partners during initial operation. For an axial bearing, this involves localized microplastic deformations to adjust the cooperating friction partners to one another with regard to their surface geometry. At the same time, the surface of a component manufactured from this alloy is soft enough to meet the requirements for embeddability of foreign particles. It is thus possible in particular to render foreign particles harmless in a targeted manner by embedding them in the surface of the component or workpiece.

Due to the above-described properties of an alloy product manufactured from this alloy, these alloy products are typically parts of axial bearings or radial bearings. According to one preferred embodiment, axial bearing parts have been manufactured from this alloy in the course of a forging process. In contrast, alloy products as radial bearing parts are preferably pressed or drawn. A typical application example for a bearing component made from this alloy is a turbocharger bearing.

The above-described favorable properties of this alloy may be improved even further when, according to a first embodiment, the high-tensile brass alloy has the following composition:

59-65 wt % Cu, in particular 59.5-65 wt % Cu;
1.3-2.3 wt % Mn, in particular 1.4-2.3 wt % Mn;
1.3-1.65 wt % Sn, in particular 1.4-1.65 wt % Sn;
0.5-1.5 wt % Fe, in particular 0.5-1.5 wt % Fe;
2.4-3.4 wt % Ni, in particular 2.55-3.4 wt % Ni;
3.1-4.1 wt % Al, in particular 3.4-4.1 wt % Al;
1.0-2 wt % Si, in particular 1.05-2 wt % Si;
maximum 2.0 wt % Co;
and the remainder Zn together with unavoidable impurities.

If cobalt is not provided in such a high-tensile brass alloy, this alloy preferably has the following composition:

59-62 wt % Cu, in particular 59.5-62 wt % Cu;
1.3-1.65 wt % Mn, in particular 1.4-1.65 wt % Mn;
1.3-1.65 wt % Sn, in particular 1.4-1.65 wt % Sn;
0.5-1.0 wt % Fe, in particular 0.6-1.0 wt % Fe;
2.4-3.4 wt % Ni, in particular 2.55-3.4 wt % Ni;
3.1-4.1 wt % Al, in particular 3.4-4.1 wt % Al;
1.0-1.7 wt % Si, in particular 5 1.05-1.7 wt % Si;
and the remainder Zn together with unavoidable impurities.

The above-mentioned high-tensile brass alloys may contain lead, but preferably only with a maximum content of 0.2 wt %, or better, preferably only with a maximum content of 0.1 wt %. In the latter case, such a high-tensile brass alloy is considered to be lead-free within the meaning of the End-of-Life Vehicle Directive.

In one particularly preferred embodiment of this high-tensile brass alloy, lead is not an alloy element that is actively introduced into the alloy, but, rather, is introduced into the alloy melt only by the use of recycling material. It must be ensured that the desired maximum lead content is not exceeded.

The high-tensile brass alloys mentioned above are typically composed exclusively of the named alloy components.

Finished cast parts, forged parts, finished extruded semi-finished products or drawn semi-finished products may be manufactured from this high-tensile brass alloy. Alloy products made of this high-tensile brass alloy are particularly suited for use in an oil environment having acidic conditions, for example with introduction of ethanol, due to the special properties of this brass alloy. If desired, final annealing of these alloy products may be provided.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is explained below based on specific exemplary embodiments, with reference to the figures, which show the following.

Before further explaining the depicted embodiments, it is to be understood that the present disclosure is not limited in its application to the details of the particular arrangements shown, since the present disclosure is capable of other embodiments. It is intended that the embodiments and figures disclosed herein are to be considered illustrative rather than limiting. Also, the terminology used herein is for the purposes of description and not limitation.

DETAILED DESCRIPTION

Test 1:

In a first test series, test specimens of an alloy having the following composition were poured and extruded:

|  | Cu | Mn | Sn | Fe | Ni | Al | Si | Zn |
|---|---|---|---|---|---|---|---|---|
| Sample 1 | 60.7 | 1.5 | 1.5 | 0.8 | 3.0 | 3.8 | 1.4 | Remainder |

Figure 1:
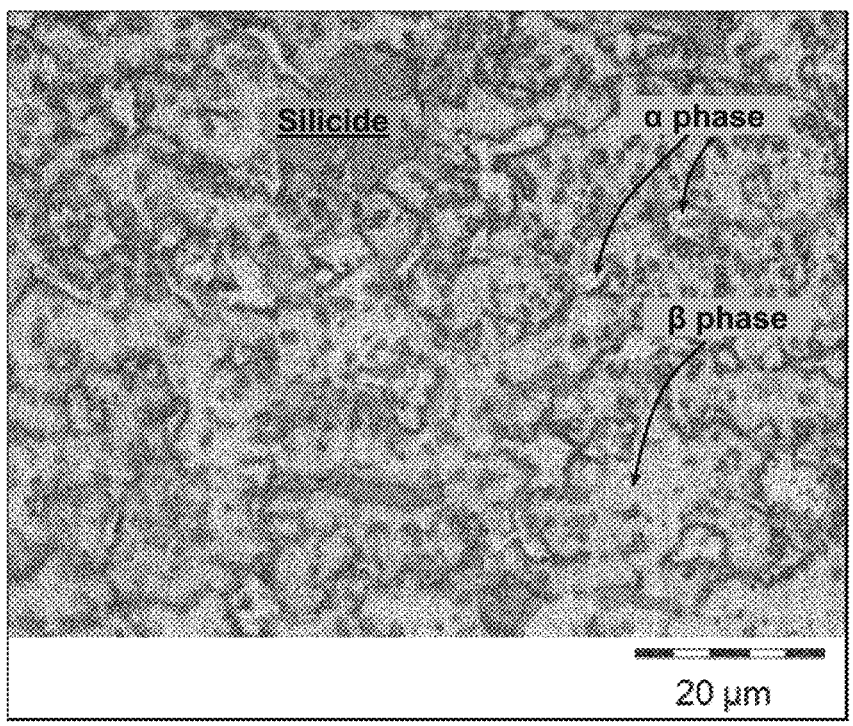
FIG. 1: shows a light micrograph of the surface of a first test specimen of a first alloy.

The light micrograph of the casting sample depicted in FIG. 1 shows the predominance of the β phase over the α phase. Silicides are discernible. The grain size of the β phase is several times larger than that of the α phase, which may be indicated with an average grain size of approximately 7-10 µm.

Figure 2:
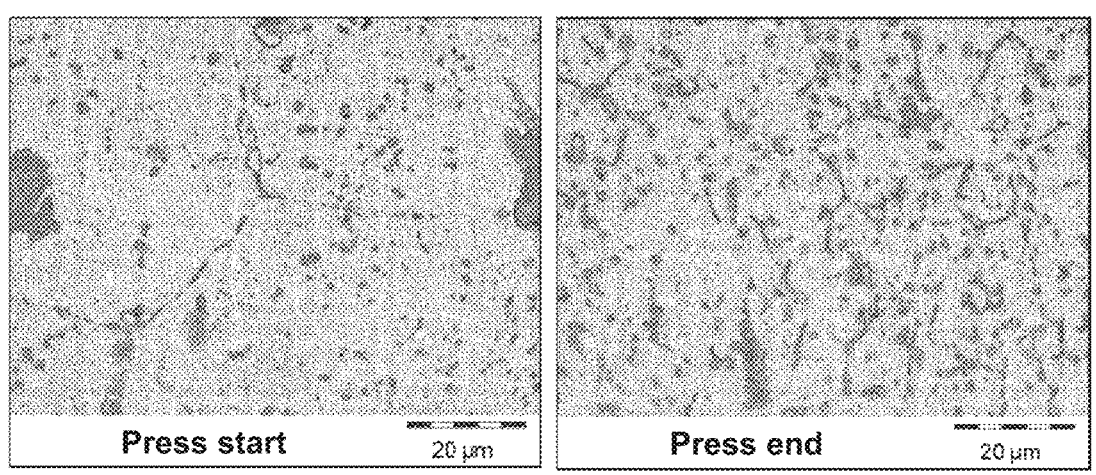
FIG. 2: shows light micrographs of samples of the same alloy as the test specimen in FIG. 1, but extruded.

The same image, also for the extruded samples of the same alloy, shows that the silicides are stretched as a result of the pressing operation due to the extrusion process at the end of pressing (see right portion of FIG. 2).

The proportion of the intermetallic phases is approximately 6% in both samples. The α mixed crystal proportion is 6% maximum. The remainder is determined by the β mixed crystal proportion.

Figure 3:
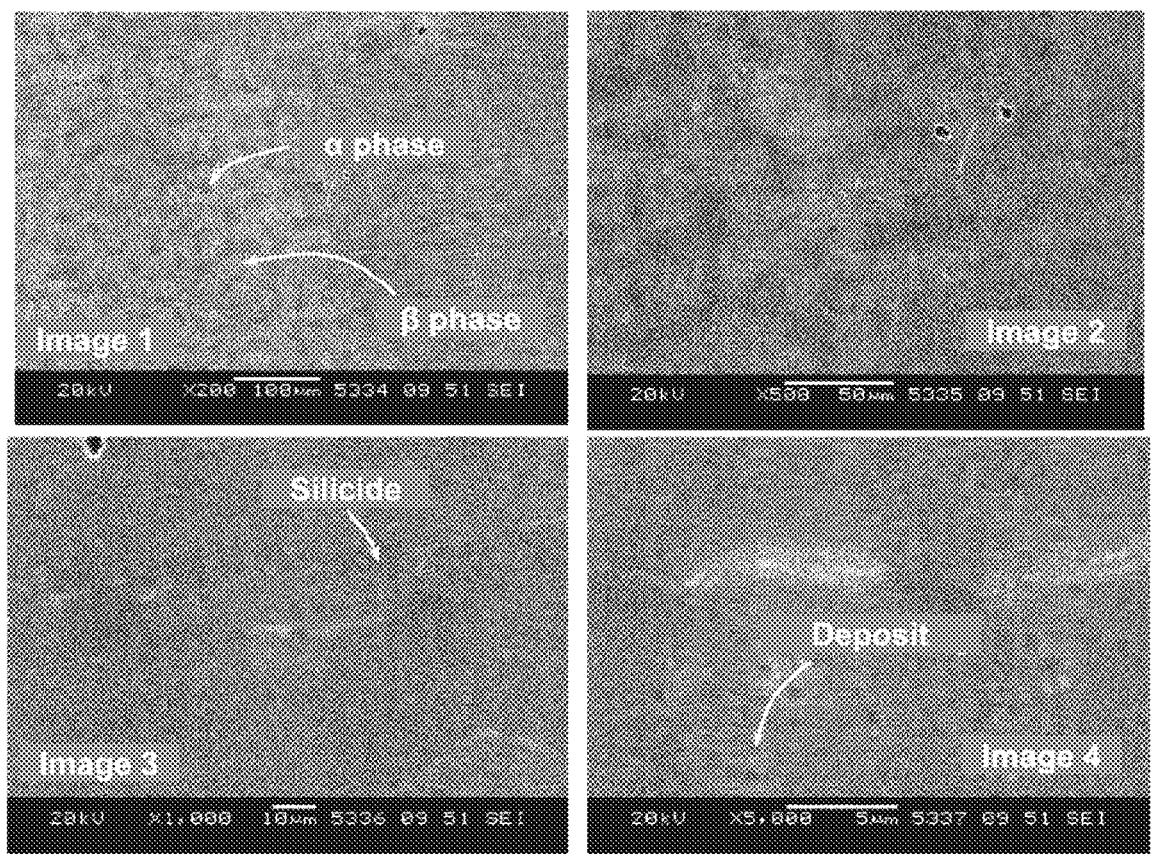
FIG. 3: shows four scanning electron micrographs of the extruded sample in FIG. 2, FIG. 4: shows the scanning electron micrographs of images 1, 2, and 4 in FIG. 3 with identification of the areas in which EDX analyses were carried out.

The small size of the deposits of much less than 1 µm is apparent in the scanning electron micrographs of the extruded sample depicted in FIG. 3.

Figure 4:
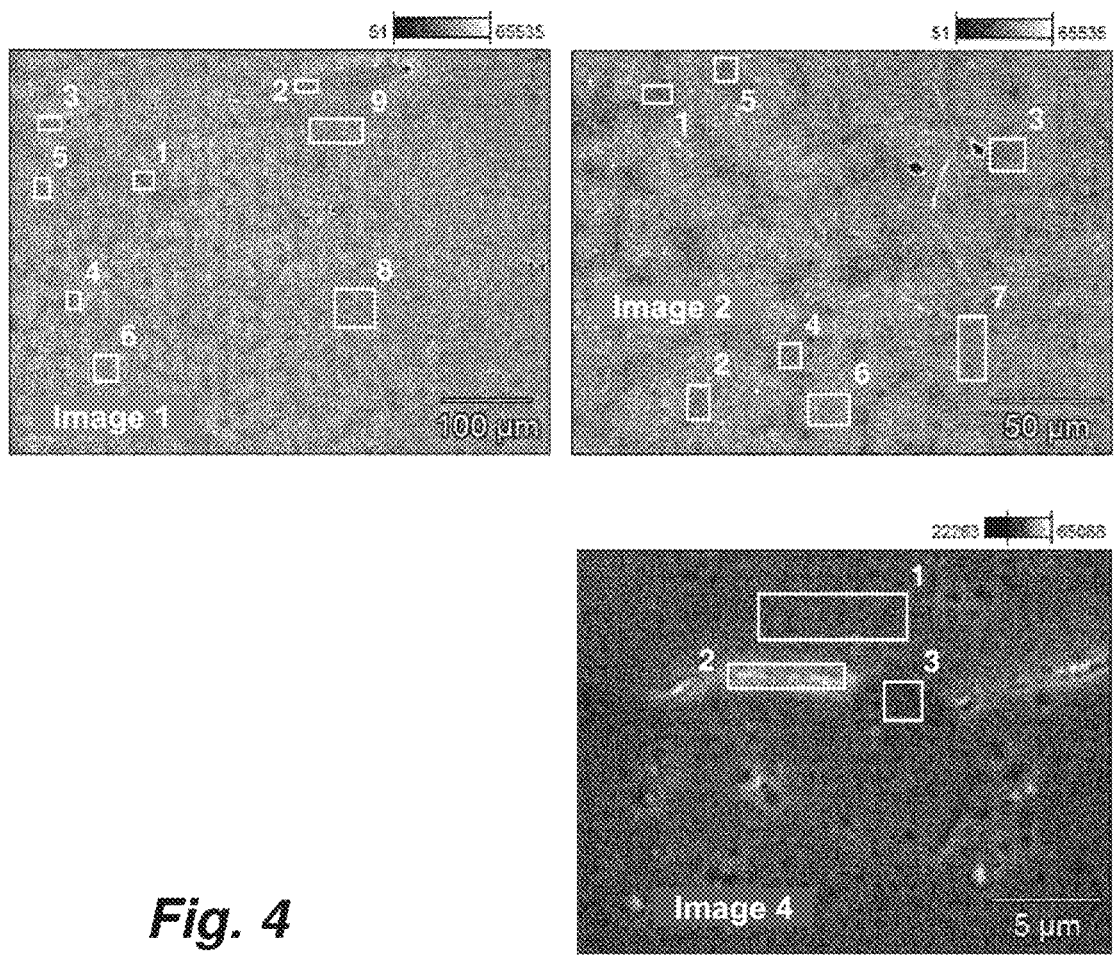

EDX analyses were performed on images 1, 2, and 4 of the scanning electron micrographs in FIG. 3. The areas in which the EDX analyses were conducted are identified in FIG. 4 and provided in Table 1.

As a result, it can be established that manganese is bound predominantly in the silicides, while tin is dissolved in the β phase. Certain quantities of manganese are also dissolved in the α phase. This is particularly advantageous because not only is a β cover layer-forming agent present, an α cover layer-forming agent (containing manganese) is present as well, due to the dissolved tin in the β phase.

Hardness tests were conducted on the extruded sample with respect to microhardness and macrohardness. The macrohardness was measured according to Brinell, with a result of 266 HB 2.5/62.5. The microhardness was determined according to Vickers. A Vickers hardness of 254-270 HV 0.01 was determined in the matrix. The intermetallic phases are naturally much harder. Hardness's between 768 and 1047 HV 0.01 were determined here.

Figure 5:
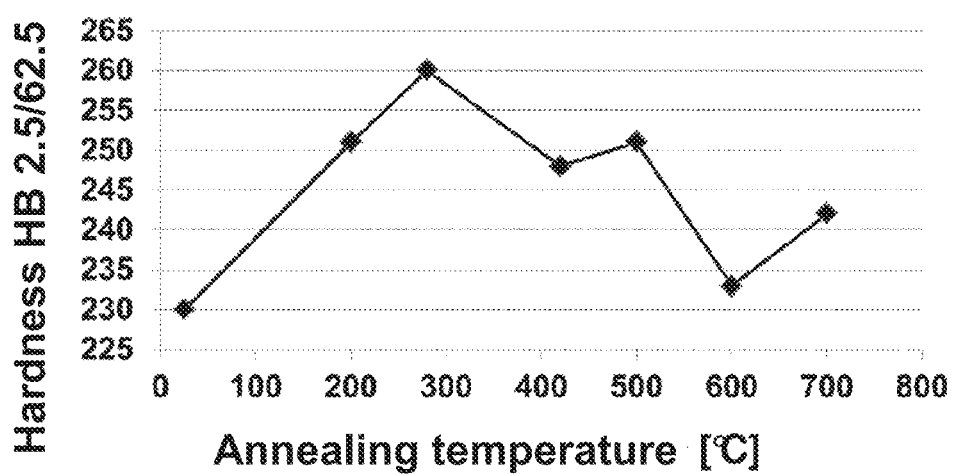
FIG. 5: shows a hardening diagram of the sample of the first alloy, Table 1: shows the EDX analyses of the sample points in FIG. 4, FIG. 6: shows a micrograph of a sample of the alloy from the preceding figures after carrying out a corrosion test.

FIG. 5 shows the hardening behavior during annealing of the sample made from this alloy. It is apparent that a hardness maximum is present between 250 and 300° C. In addition, these samples showed no, or only negligible, softening at elevated temperatures.

This sample was subsequently tested for various strength parameters. The following results were obtained:

| Rp0.2 [N/mm$^2$] | Rm [N/mm$^2$] | A [%] | Hardness |
|---|---|---|---|
| 670 | 840 | 3.7% | 266 HB 2.5/62.5 |

These results were verifiable with further test specimens. The following strength values were obtained for an extruded and annealed sample having the same composition as that previously described:

| Rp0.2 [N/mm$^2$] | Rm [N/mm$^2$] | A [%] | Hardness |
|---|---|---|---|
| 592 | 727 | 3.5% | 261 HB 2.5/62.5 |

These samples showed a very fine structure and high strength and hardness overall.

The first-mentioned sample together with reference samples was subjected to corrosion testing.

For purposes of the corrosion testing, the samples were halfway immersed in a mixture of motor oil, 20% bioethanol E85 (85% ethanol), and sulfuric acid. The pH was adjusted to 2.6. The tests were carried out at 60° C. The sample was kept in this mixture for two days, then removed and evaluated by light microscopy.

Figure 6:
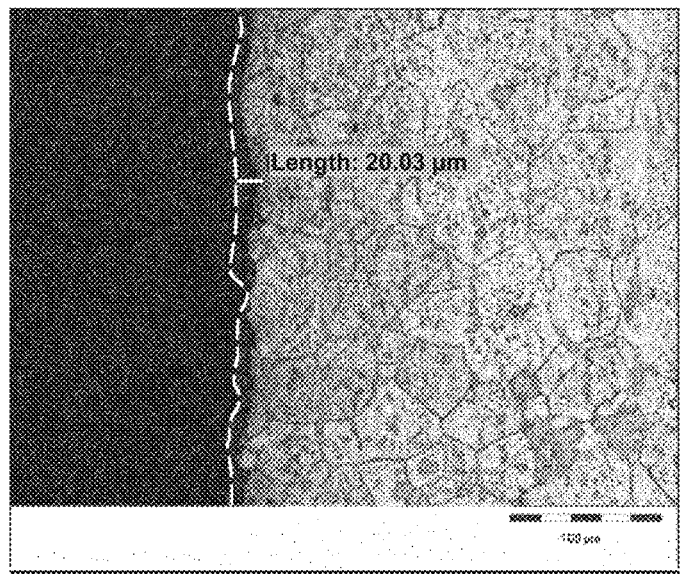

FIG. 6 shows the portion of the sample subjected to corrosion testing. The light micrograph in FIG. 6 shows that there is only a slight corrosion attack, and therefore deeper areas of material remain effectively protected from corrosion. The formation of a cover layer that protects the deeper areas from corrosion was observed in this sample. The cover layer is marked with respect to its thickness in the figure. The measurement was performed in a slight surface indentation. The cover layer is indicated by a dashed line in FIG. 6 for better identification. As shown by the tests, this cover layer has good adherence. It is emphasized that not only the α phase, but also the grain boundaries and the β phase are corrosion-resistant.

Figure 7:
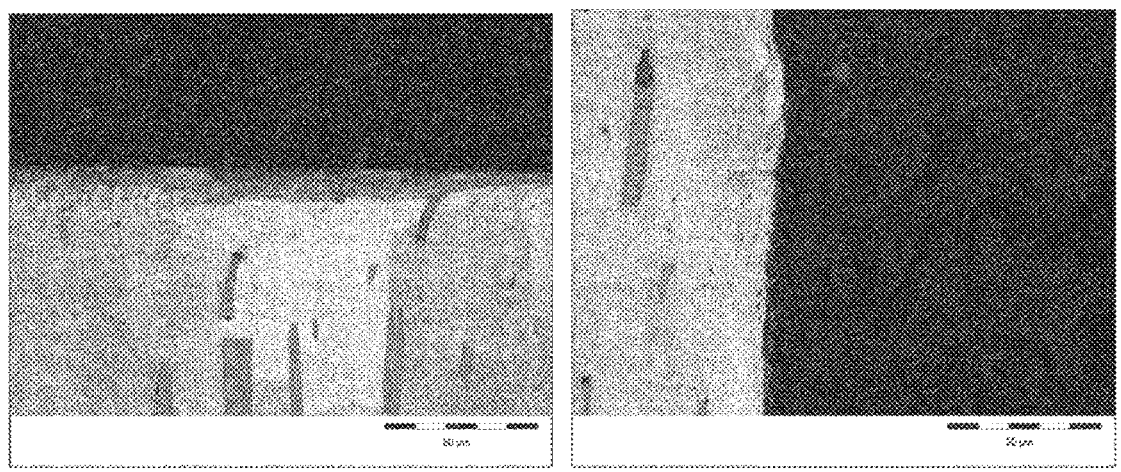
FIG. 7: shows micrographs of samples, made of a first comparative alloy, that were subjected to the same corrosion test.

FIG. 7 shows the result for a comparative sample made of the alloy CuZn37Mn3Al2PbSi, which was produced and tested for corrosion using the same parameters. Localized layer formation is clearly apparent, in the image on the left.

A reference sample made of the alloy CuZn36 was also produced and tested for corrosion using the same parameters. Formation of corrosion cracks and development of plugs were observed in this sample.

The image on the right in the bottom row was additionally treated in pure, highly concentrated sulfuric acid.

The electrical conductivity of this sample was 7.8 MS/m, and therefore is at the same level as the electrical conductivity of the comparative alloy CuZn37Mn3Al2PbSi. It is thus shown that the electrical conductivity did not increase, or in any case did not increase appreciably, compared to the reference sample because of the corrosion-increasing measures. The electrical conductivity of the other reference alloy was 15.5 MS/m.

Test 2:

In a second test series, test specimens of an alloy having the following composition were poured and extruded:

|  | Cu | Mn | Sn | Fe | Ni | Al | Si | Co | Zn |
|---|---|---|---|---|---|---|---|---|---|
| Sample 1 | 61.2 | 1.5 | 1.5 | 0.8 | 3.0 | 3.8 | 1.4 | 1.2 | Remainder |

Figure 9:
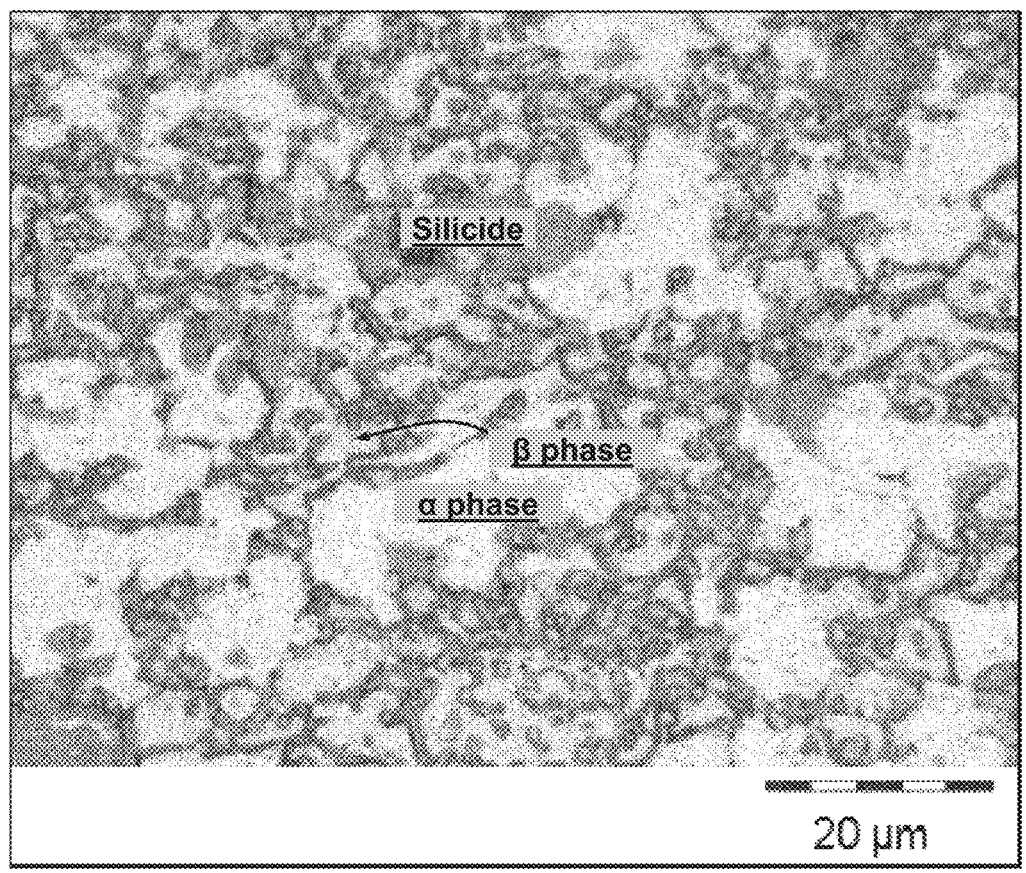
FIG. 9: shows a light micrograph of the surface of a sample of a second alloy.

The light micrograph of the casting sample depicted in FIG. 9 shows the predominance of the β phase over the α phase. Silicides having grain sizes of approximately 5-7 μm are discernible. Compared to the alloy in Test 1, the grains of the α phase in this alloy are much larger than those of the β phase.

Figure 10:
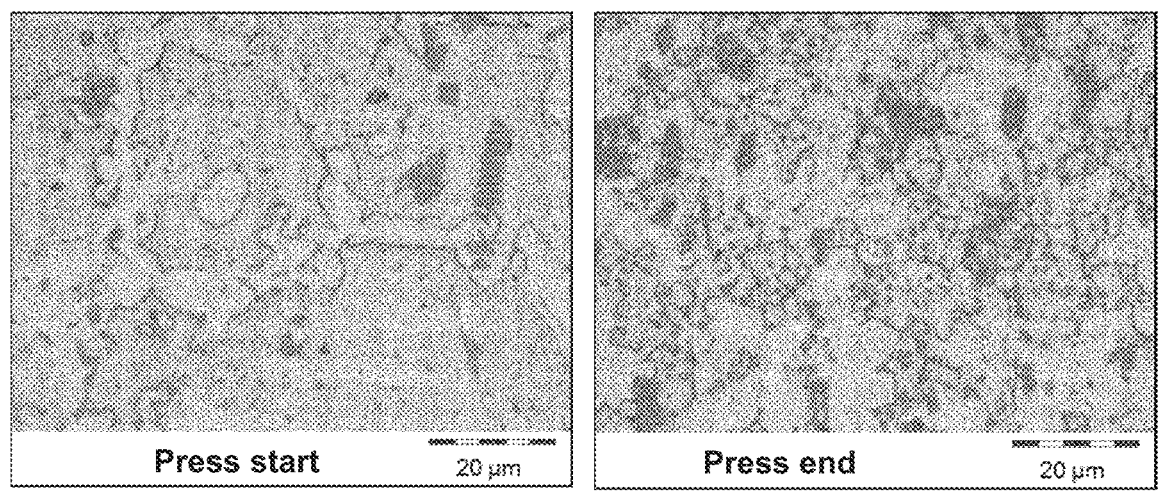
FIG. 10: shows light micrographs of samples of the same alloy, but extruded.

The same image, also for the extruded samples of the same alloy, shows that the silicides are stretched as a result of the pressing operation due to the extrusion process at the end of pressing (see right portion of FIG. 10).

The proportion of the intermetallic phases is approximately 7% in the samples. The α mixed crystal proportion is 30% maximum. The remainder is determined by the β mixed crystal proportion. The alloy is particularly well suited for cold finishing due its high a proportion.

Figure 11:
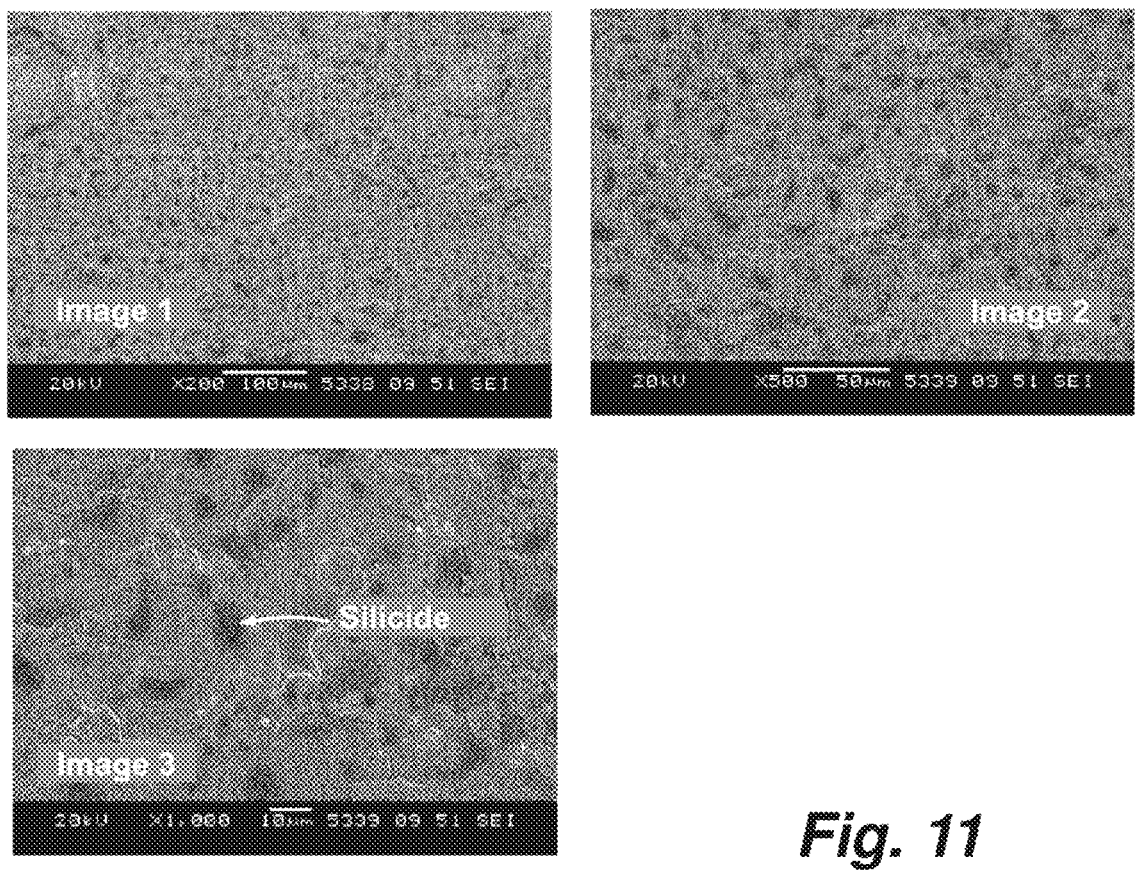
FIG. 11: shows four scanning electron micrographs of the extruded sample in FIG. 10, FIG. 12: shows scanning electron micrographs of the samples in FIG. 11 with identification of the areas in which EDX analyses were carried out.

The small size of the deposits is apparent in the scanning electron micrographs of the extruded sample depicted in FIG. 11.

Figure 12:
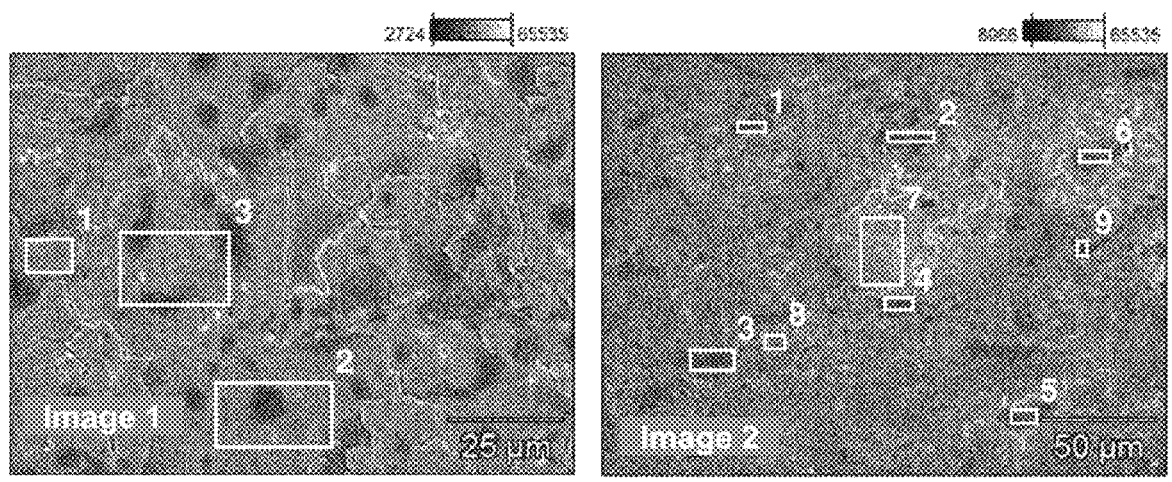

FIG. 12 shows scanning electron micrographs in areas of the samples in FIG. 11. The areas in which the EDX analyses were conducted are identified in FIG. 12 and provided in Table 2.

As a result, it can be established that manganese is bound predominantly in the silicides, while tin is dissolved in the β phase. Certain quantities of manganese are also dissolved in the α phase. This is particularly advantageous because not only is a β cover layer-forming agent present, an α cover layer-forming agent (containing manganese) is present as well, due to the tin that is dissolved in the β phase.

Hardness tests were conducted on the extruded sample with respect to microhardness and macrohardness. The macrohardness was measured according to Brinell, with a result of 204-225 2.5/62.5. The microhardness was determined according to Vickers. A Vickers hardness of 129-172 HV 0.01 was determined in the matrix, and 240-305 HV 0.01 in the α phase. The intermetallic phases are naturally much harder. Hardness's between 826 and 961 HV 0.01 were determined here.

Figure 13:
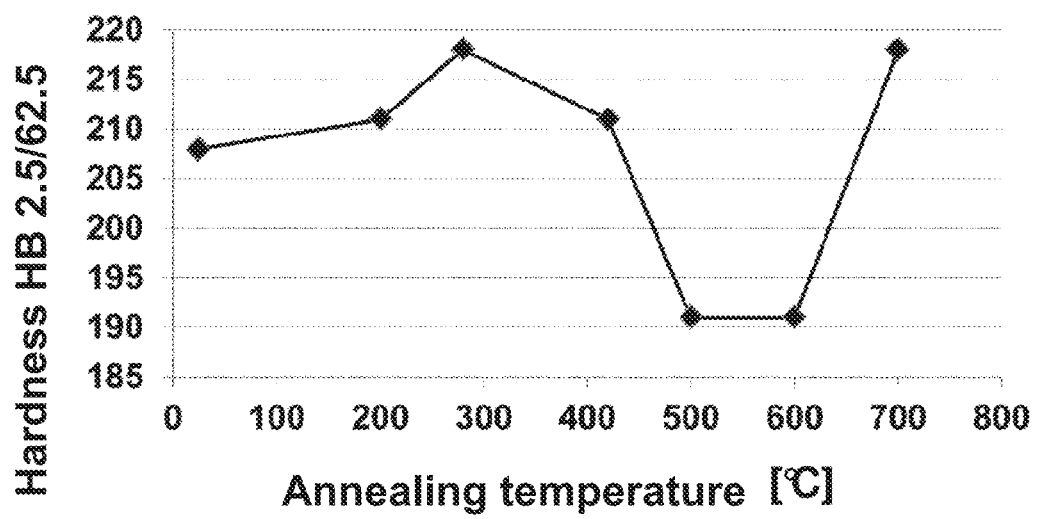
FIG. 13: shows a hardening diagram of the sample of the second alloy.

FIG. 13 shows the hardening behavior during annealing of the sample made from this alloy. It is apparent that a hardness maximum is present at approximately 300° C. Marked softening was determinable above 450° C. During annealing above 600° C., an increase in hardness was observed due to conversion of the α phase portions to β phase portions.

This sample was subsequently tested for various strength parameters. The following results were obtained:

| Rp0.2 [N/mm$^2$] | Rm [N/mm$^2$] | A [%] | Hardness |
|---|---|---|---|
| 455 | 680 | 4.7 | 44HB 2.5/62.5 |

These samples showed a very fine structure and high strength and hardness overall.

Figure 8:
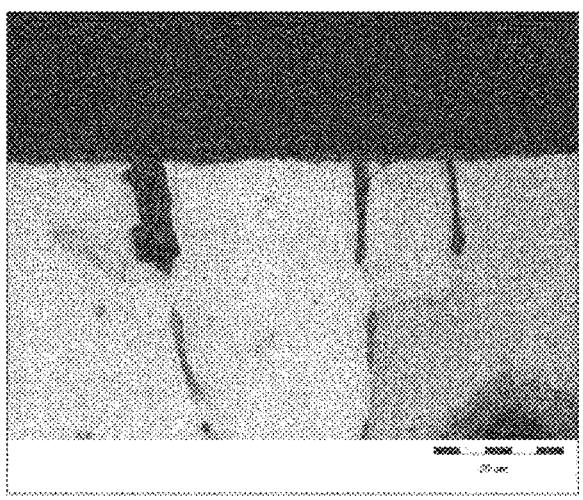
FIG. 8: shows micrographs of samples, made of a second comparative alloy, that were subjected to the same corrosion test.
Figure 8:
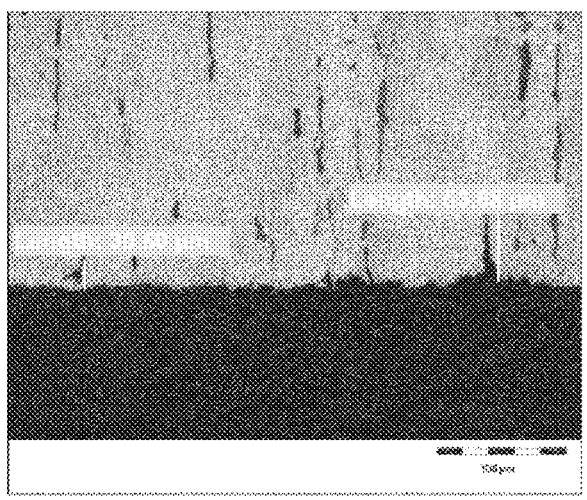
Figure 8:
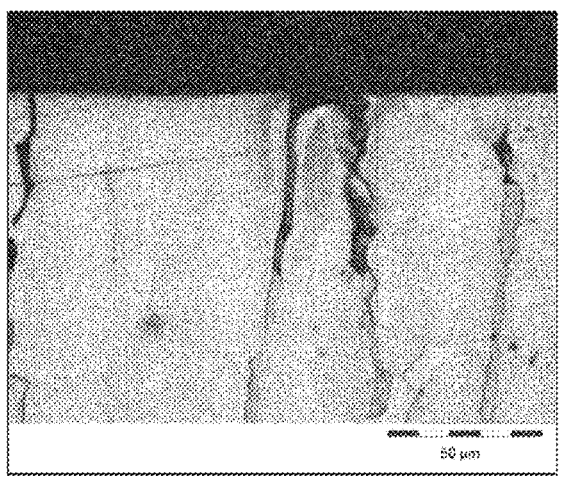
Figure 8:
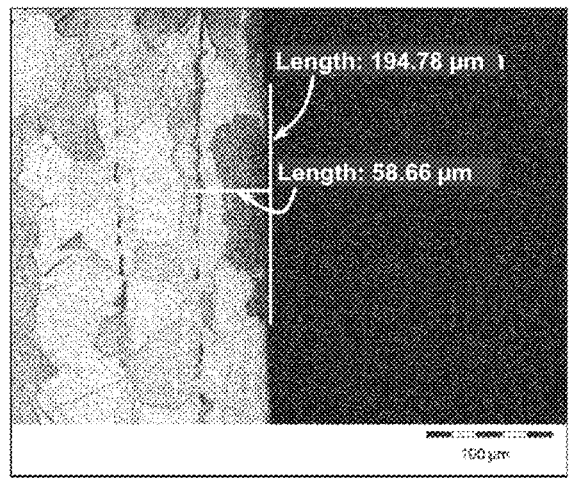

The sample together with reference samples was subjected to corrosion testing. The corrosion tests were carried out as previously described. The same reference samples were used as in Test 1. In this regard, reference is made to FIGS. 7 and 8 and the accompanying discussion.

Figure 14:
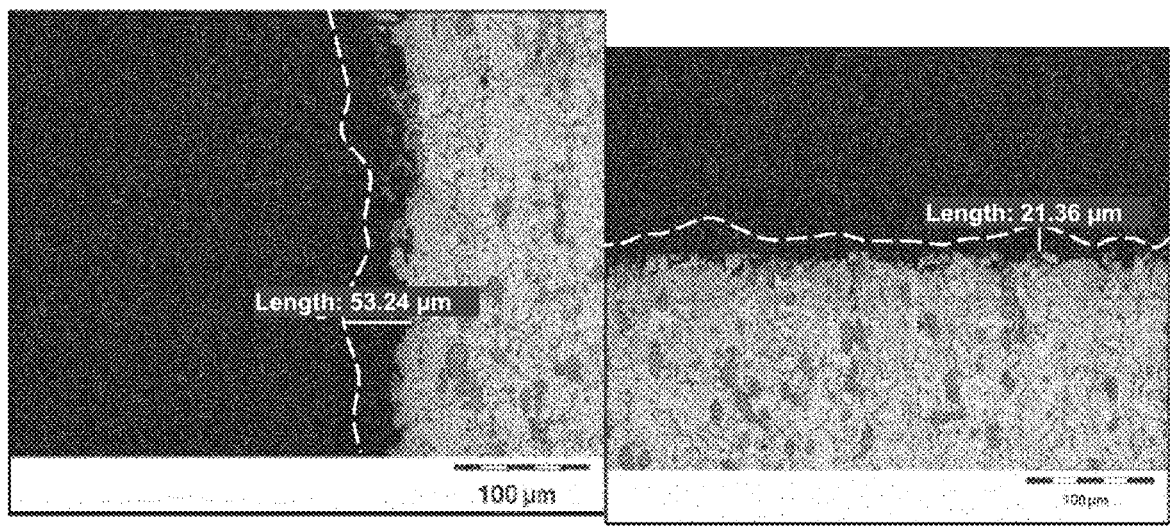
FIG. 14: shows micrographs of a sample of the second alloy after carrying out a corrosion test, and Table 2: shows the EDX analyses of the sample points in FIG. 12.

FIG. 14 shows two light micrographs of the sample of the second alloy after the corrosion treatment. Formation of a cover layer was observed. Thus, deeper areas of material remain effectively protected from corrosion. In addition to the α phase, also the grain boundaries and the β phase are corrosion-resistant for this sample.

The electrical conductivity of this sample was 6.8 MS/m and is thus even lower than the electrical conductivity of the reference alloy CuZn37Mn3Al2PbSi.

Based on a comparison of the results obtained with the alloy of Test 1 to those of the alloy of Test 2, it is apparent that the alloy according to Test 1, which contains no cobalt, tends toward much stronger deposit hardening and deposit solidification. In the alloy according to Test 2, which contains cobalt, this element favors the formation of fairly coarse primary grains as secondary deposits of the silicides. The results show that cobalt influences the kinetics of the silicide formation. If a higher level of silicide involvement is desired, the alloy is designed without cobalt, or with only a small proportion of cobalt. The differences in the formation of the β phase are likewise attributable to the incorporation of cobalt. Cobalt has a stabilizing effect on the α phase.

The present disclosure was described based on exemplary embodiments. A person skilled in the art will derive numerous embodiments for implementing the present disclosure without departing from the scope of the present claims. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this present disclosure as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the present disclosure.

The invention claimed is:

1. A high-tensile brass alloy comprising
   55-65 wt % Cu;
   1-2.5 wt % Mn;
   0.7-2 wt % Sn;
   0.2-1.5 wt % Fe;
   2-4 wt % Ni;
   2-5 wt % Al;
   0.2-2 wt % Si;
   2.0 wt % Co maximum;
   0.1 wt % Pb maximum;
   and the remainder Zn together with unavoidable impurities;
   wherein the sum of the elements Mn and Sn is at least 1.7 wt % and is at most 4.5 wt %.

2. The high-tensile brass alloy of claim 1, wherein the elements Mn and Sn are present in the alloy in a Mn to Sn ratio between 1.25 and 0.85.

3. The high-tensile brass alloy of claim 2, wherein the ratio of the elements Mn to Sn is between 1.1 and 0.92.

4. The high-tensile brass alloy of claim 3, comprising
   59-65 wt % Cu;
   1.3-1.65 wt % Mn;
   1.3-1.65 wt % Sn;
   0.5-1.0 wt % Fe;
   2.4-3.4 wt % Ni;
   3.1-4.1 wt % Al;
   1.0-1.7 wt % Si;
   2.0 wt % Co maximum;
   0.1 wt % Pb maximum;
   and the remainder Zn together with unavoidable impurities.

5. The high-tensile brass alloy of claim 1, comprising
   59-65 wt % Cu;
   1.3-1.65 wt % Mn;
   1.3-1.65 wt % Sn;
   0.5-1.0 wt % Fe;
   2.4-3.4 wt % Ni;
   3.1-4.1 wt % Al;
   1.0-1.7 wt % Si;
   2.0 wt % Co maximum;
   0.1 wt % Pb maximum;
   and the remainder Zn together with unavoidable impurities.

6. The high-tensile brass alloy of claim 5, wherein the Cu content is 59-62 wt %.

7. The high-tensile brass alloy of claim 5, wherein the Co content is 0.9-1.6 wt %, in particular 0.9-1.5 wt %, particularly preferably 0.9-1.1 wt %.

8. A high-tensile brass alloy product manufactured from the high-tensile brass alloy of claim 5, wherein the high-tensile brass alloy product is made up predominantly of the β phase.

9. The high-tensile brass alloy product of claim 8, wherein the Cu content is 59-62 wt % and the proportion of the α phase is less than 10%.

10. The high-tensile brass alloy product of claim 8, wherein the proportion of the α phase is less than 35%.

11. The high-tensile brass alloy product of claim 10, wherein the Co content is 0.9-1.6 wt %.

12. The high-tensile brass alloy product of claim 8, wherein the alloy product is a bearing part, preferably for use in a bearing in an oil environment possibly having acidic conditions.

13. The high-tensile brass alloy product of claim 12, wherein the bearing part is a part for a turbocharger bearing.

14. The high-tensile brass alloy product of claim 8, wherein the proportion of intermetallic phases is between 5 and 9%.

15. A high-tensile brass alloy product manufactured from the high-tensile brass alloy of claim 1, wherein the high-tensile brass alloy product is made up predominantly of the β phase.

16. The high-tensile brass alloy product of claim 15, wherein the proportion of intermetallic phases is between 5 and 9%.

17. The high-tensile brass alloy product of claim 15, wherein the electrical conductivity of the high-tensile brass alloy product is <10 MS/m.

18. The high-tensile brass alloy product of claim 17, wherein the electrical conductivity of the high-tensile brass alloy product is <8.2 MS/m.

19. The high-tensile brass alloy product of claim 15, wherein the alloy product is a bearing part, preferably for use in a bearing in an oil environment possibly having acidic conditions.

20. The high-tensile brass alloy product of claim 19, wherein the bearing part is a part for a turbocharger bearing.

* * * * *